Figure 1A:
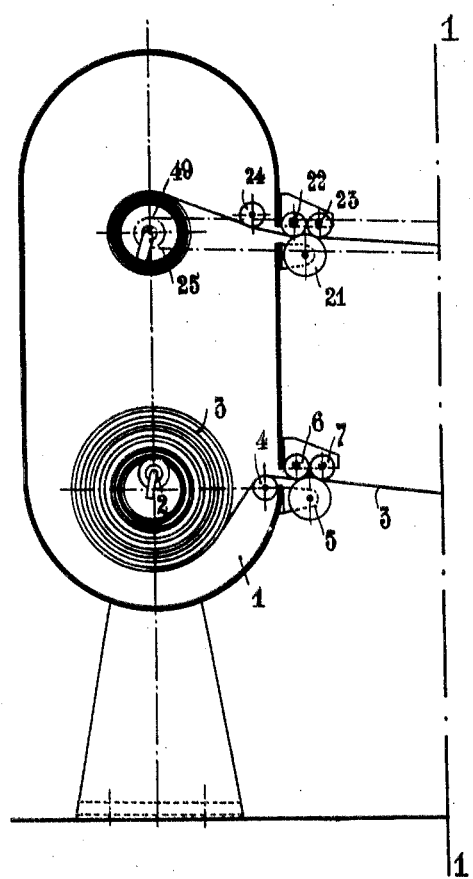

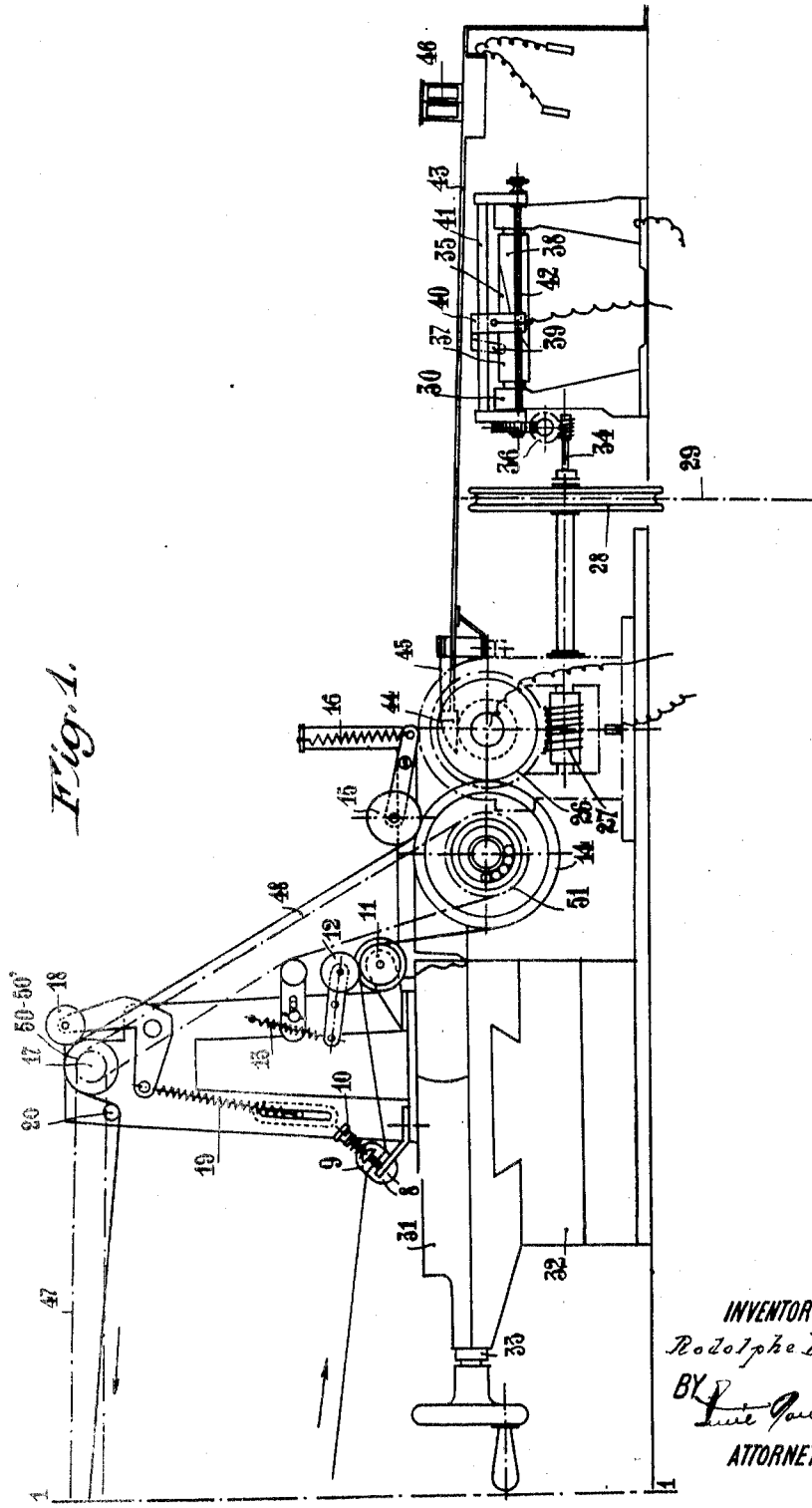

Feb. 9, 1932. R. BERTHON 1,844,418
FILM GOFFERING MACHINE
Filed Oct. 4, 1928    2 Sheets-Sheet 2

INVENTOR:
Rodolphe Berthon
BY
ATTORNEY

Patented Feb. 9, 1932

1,844,418

UNITED STATES PATENT OFFICE

RODOLPHE BERTHON, OF NEUILLY, FRANCE, ASSIGNOR, BY MESNE ASSIGNMENTS, TO KISLYN CORPORATION, OF NEW YORK, N. Y., A CORPORATION OF DELAWARE

FILM GOFFERING MACHINE

Application filed October 4, 1928, Serial No. 310,402, and in France October 6, 1927.

The object of this invention is to provide an improved machine for goffering films for colour photography and kinematography with lenticular refracting nets, characterized by a system for tensioning the film by utilizing the horizontal arrangement of the electrically heated embossing roller with respect to the pressing roller.

In order to make the invention more clearly understood, I have illustrated an embodiment thereof in the accompanying drawings, wherein Figures 1 and 1^A jointly represent a part-sectional side elevation of the machine.

In the lower part of a suitable housing 1, a film roll 3 unreels from a spindle 2. The end of the film is taken over rollers 4 and 5; rollers 6 and 7 exerting some pressure on the film and on the roller 5 owing to their weight. Velvet or felt pads 8 and 9, adjustable by means of nut 10, clean the film while also serving to tension the same. The film is next carried over a copper spool 11 whereon it is kept by roller 12 the pressure of which is increased by spring 13, and thereafter is led around a pressure roller 14 fitted with ball bearings and ebonite surfaced. The film is then subjected to pressure again by another roller 15 which is also provided with a spring 16 serving to ensure proper guidance of the film. The same kind of arrangement is repeated with parts 17, 18, 19, after which the film is passed over various guide rollers or spindles 20, 21, 22, 23 and 24 ultimately to be wound, at the upper portion of housing 1, upon a drum 25. By causing bed 31 to slide on bed 32 by means of a suitable adjusting device 33, roller 14 which is connected to move with bed 31, will come to press the film 3 against the embossing roller 26 which is suitably heated by an electric current and is actuated by a worm 27 controlled by a pulley 28, said pulley 28 being connected with a dynamo by a belt 29. An electric heating device 30 permits of the current distribution being adjusted. A spindle 34 rotates a special roller 35 through gearing 36. Said roller 35 is divided into two portions 37, 38 one of which is made of some insulating material and the other of copper or of any other conducting metal. A finger 39 is in permanent contact with roller 35 but permits of electric current being supplied only when it is in contact with the conducting portion of the roller.

Said finger 39 is carried by member 40 adapted to travel on a spindle 41 movement of member 40, which is formed as a nut, being obtained by means of a screw shaft 42. Finger 39, which is taken along by member 40, is moved on roller 35, thereby adjusting the duration of the current-supply period.

A thermometer is located in a tube 43 that carries on its free end a conducting block 44 adapted to be pressed against roller 26 by a spring 45. A small red lamp, located in a housing 46, permits of the thermometric graduations being read, since operation is, of course, carried on in darkness.

The film is fed along by means of chains 47, 48 connecting toothed pinions 49, 50, 50' and 51.

I claim as my invention:

1. In a film-goffering machine, a horizontal pressure roller around which the film passes; a horizontal embossing roller parallel therewith; an adjusting device for moving the pressure roller bodily toward the embossing roller and maintaining the two in parallelism; means for supplying current periodically to said embossing roller to heat the same; means for varying the duration of the current-supply periods at will; and means for driving the embossing roller.

2. In a film-goffering machine, the combination of horizontal winding and unwinding reels from one to the other of which a film to be goffered travels; a horizontal pressure roller intermediate said reels and around which the film passes; a horizontal embossing roller parallel with the pressure roller; a flat horizontal stationary bed carrying the embossing roller; a similar sliding bed mounted directly on the stationary bed and carrying the pressure roller; an adjusting device for moving the sliding bed endwise along the stationary bed to shift the pressure roller in a lateral direction bodily toward the embossing roller and maintain the two in parallelism; means for feeding the film and for driving the pressure roller; and means for driving the embossing roller.

3. In a film-goffering machine, a horizontal pressure roller around which the film passes; a horizontal embossing roller parallel therewith; means for moving one of said rollers bodily toward the other to press the film against the embossing roller; means for supplying current periodically to said embossing roller to heat the same; means for varying the duration of the current-supply periods at will; and means for driving the embossing roller.

4. In a film-goffering machine, a horizontal pressure roller around which the film passes; a horizontal embossing roller parallel therewith; means for pressing the film on the pressure roller against the embossing roller; means for supplying current periodically to said embossing roller to heat the same; means for varying the duration of the current-supply periods at will; and means for driving the embossing roller.

5. In a film-goffering machine, a horizontal pressure roller around which the film passes, a horizontal embossing roller parallel therewith, means for moving one of said rollers bodily toward the other to press the film against the embossing roller, means for supplying electric current to said embossing roller to heat the same, means for regulating the amount of said current passing to the embossing roller, and means for driving the embossing roller.

In testimony whereof I affix my signature.

RODOLPHE BERTHON.